United States Patent
Tomatsuri et al.

(10) Patent No.: US 6,949,905 B2
(45) Date of Patent: Sep. 27, 2005

(54) SERVO CONTROL SYSTEM AND METHOD OF SETTING

(75) Inventors: Kazuhiko Tomatsuri, Tokyo (JP); Hidehiko Matsumoto, Tokyo (JP); Aya Imahashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 4 days.

(21) Appl. No.: 10/476,268

(22) PCT Filed: Jul. 4, 2001

(86) PCT No.: PCT/JP01/05795
§ 371 (c)(1),
(2), (4) Date: Oct. 30, 2003

(87) PCT Pub. No.: WO03/005141
PCT Pub. Date: Jan. 16, 2003

(65) Prior Publication Data
US 2004/0135532 A1 Jul. 15, 2004

(51) Int. Cl.⁷ .................. G05B 19/10; G05B 19/408; G05B 13/02; G06F 19/00
(52) U.S. Cl. .................. 318/567; 318/568.22; 318/578; 318/632; 318/162; 318/561; 700/28; 700/173; 700/254
(58) Field of Search .................. 318/567, 578, 318/568.22, 609, 610, 632, 685, 615–619, 650–652, 162–164, 561; 700/28, 30, 37, 41–43, 54, 173, 183, 254

(56) References Cited

U.S. PATENT DOCUMENTS

| | | | | |
|---|---|---|---|---|
| 5,248,921 A | * | 9/1993 | Kato et al. | 318/560 |
| 5,304,905 A | * | 4/1994 | Iwasaki | 318/561 |
| 5,600,221 A | * | 2/1997 | Tomatsuri et al. | 318/632 |
| 5,726,545 A | * | 3/1998 | Iwashita et al. | 318/432 |
| 6,107,771 A | * | 8/2000 | Maeda | 318/630 |
| 6,133,705 A | * | 10/2000 | Inoue et al. | 318/632 |
| 6,274,994 B2 | * | 8/2001 | Tsutsui | 318/560 |
| 6,744,233 B1 | * | 6/2004 | Tsutsui | 318/560 |

FOREIGN PATENT DOCUMENTS

| | | | | |
|---|---|---|---|---|
| JP | 3-65706 A | | 3/1991 | |
| JP | 05224704 A | * | 9/1993 | G05B/13/02 |
| JP | 7-104855 A | | 4/1995 | |
| JP | 7-311609 A | | 11/1995 | |
| JP | 8-50503 A | | 2/1996 | |
| JP | 08030313 A | * | 2/1996 | G05B/19/404 |
| JP | 9-160619 A | | 6/1997 | |
| JP | 10323070 A | * | 12/1998 | H02P/5/00 |

* cited by examiner

Primary Examiner—Edgardo San Martin
(74) Attorney, Agent, or Firm—Sughrue Mion, PLLC

(57) ABSTRACT

A servo control system which comprises an original cam pattern generator 11 for generating a first pattern of a cam shape relative to a phase corresponding to one revolution of a cam mechanism; a corrector 14 for differentiating the original pattern of the original pattern generator 11 with respect to time, multiplying the differentiation value by a constant to find a multiplication value, and subtracting a predetermined phase from the multiplication value to generate a correction cam pattern; and a position command device 14 for adding the above-mentioned correction pattern to the above-mentioned original pattern to generate a second pattern and generating a position command of the above-mentioned servomotor based on the phase corresponding to one revolution of the above-mentioned cam mechanism using the second pattern.

3 Claims, 7 Drawing Sheets

SERVO CONTROL SYSTEM AND METHOD OF SETTING

TECHNICAL FIELD

This invention relates to a servo control system for causing a servomotor to operate as a cam pattern according to a position command compensating for a follow-up delay in electronic cam control and a setting method of the servo control system.

BACKGROUND OF THE INVENTION

Hitherto, as for cam operation, a mechanical cam for providing output in conjunction with motion of a cam attached to a shaft has been used. In a method using the mechanical cam, it is difficult to adjust a cam pattern. Thus, an electronic cam has been used for which the relationship between rotation of a shaft and cam shape data is previously registered, the rotation position of the shaft is detected, and based on the detection value, a servomotor is controlled for performing cam operation.

In such electronic cam control, a servo control system disclosed in JP-A-7-104855 is available for the purpose of decreasing the difference between a position command and position feedback. In an electronic cam phase control method for controlling a servo system in accordance with a position command having a predefined position pattern relative to the transition of a phase command θ, the servo control system generates a phase delay amount Δθ caused by a follow-up delay of the servo system relative to the position command as a function of phase transition speed ω, inputs a signal with the phase delay amount Δθ added to the phase command to a position pattern generation circuit, and adopts an output signal therefrom as a position command of the servo system.

Such a servo control system can compensate for the phase delay of the electronic cam.

However, the above-described servo control system outputs the position command in advance almost proportional to the phase delay amount and thus compensates only for the phase delay amount. That is, it does not compensate for the follow-up delay of the servo system and thus particularly if the control speed is high, the follow-up delay of the servo system becomes noticeable as shown in FIG. 7. Thus, the locus of the actual positions of the servomotor differs largely from the locus of the position command prepared from a cam pattern and the actual position difference between the position command and the servomotor becomes ΔL at time ta; this is a problem.

DISCLOSURE OF THE INVENTION

The invention is embodied to solve the above-mentioned problems and it is an object of the invention to provide a simple servo control system compensating for a follow-up delay of a servo block in electronic cam control and a setting method of the servo control system.

According to a first aspect of the invention, there is provided a servo control system comprising pattern generation means for generating a first pattern as a position command of a cam shape relative to a phase corresponding to one revolution of the above-mentioned cam mechanism; correction means for differentiating the above-mentioned first pattern with respect to time, multiplying the differentiation value by a constant having a dimension of a reciprocal of the above-mentioned position control gain to find a multiplication value, and subtracting a predetermined phase from the multiplication value, thereby generating a correction pattern as a correction position command; and position command generation means for adding the above-mentioned correction pattern to the above-mentioned first pattern to generate a second pattern and generating a position command of the above-mentioned servomotor based on the phase corresponding to one revolution of the above-mentioned cam mechanism using the second pattern.

According to the servo control system, the correction means differentiates the first pattern with respect to time, multiplies the differentiation value by a constant, having a dimension of the reciprocal of the position control gain, and subtracting a predetermined phase from the above-mentioned phase to generate a correction pattern as a correction position command, and the position command generation means adds the correction pattern to the first pattern to generate a second pattern and generates a position command of the above-mentioned servomotor based on the phase corresponding to one revolution of the cam mechanism using the second pattern.

According to a second aspect of the invention, there is provided a setting method of the servo control system in the first aspect of the invention, the setting method of executing a first step of presetting a value of the above-mentioned constant, increasing a predetermined value of the phase little by little, and storing a value at which the difference between a position of the above-mentioned servomotor and the position command of the above-mentioned position command generation means becomes small in storage means as an optimum value of the above-mentioned phase; and then executing a second step of previously increasing the value of the above-mentioned constant little by little and storing a value at which the difference between the position of the above-mentioned servomotor and the position command of the above-mentioned position command generation means becomes small in storage means as an optimum value of the phase.

The servo control system has the advantage that the optimum constant and phase can be set easily.

The servo control system according to a third aspect of the invention is characterized by the fact that in the first aspect of the invention, the constant is the reciprocal of a position control gain in servo system.

The servo control system has the advantage that the constant can be set easily.

BEST MODE FOR CARRYING OUT THE INVENTION

First Embodiment.

Figure 1:
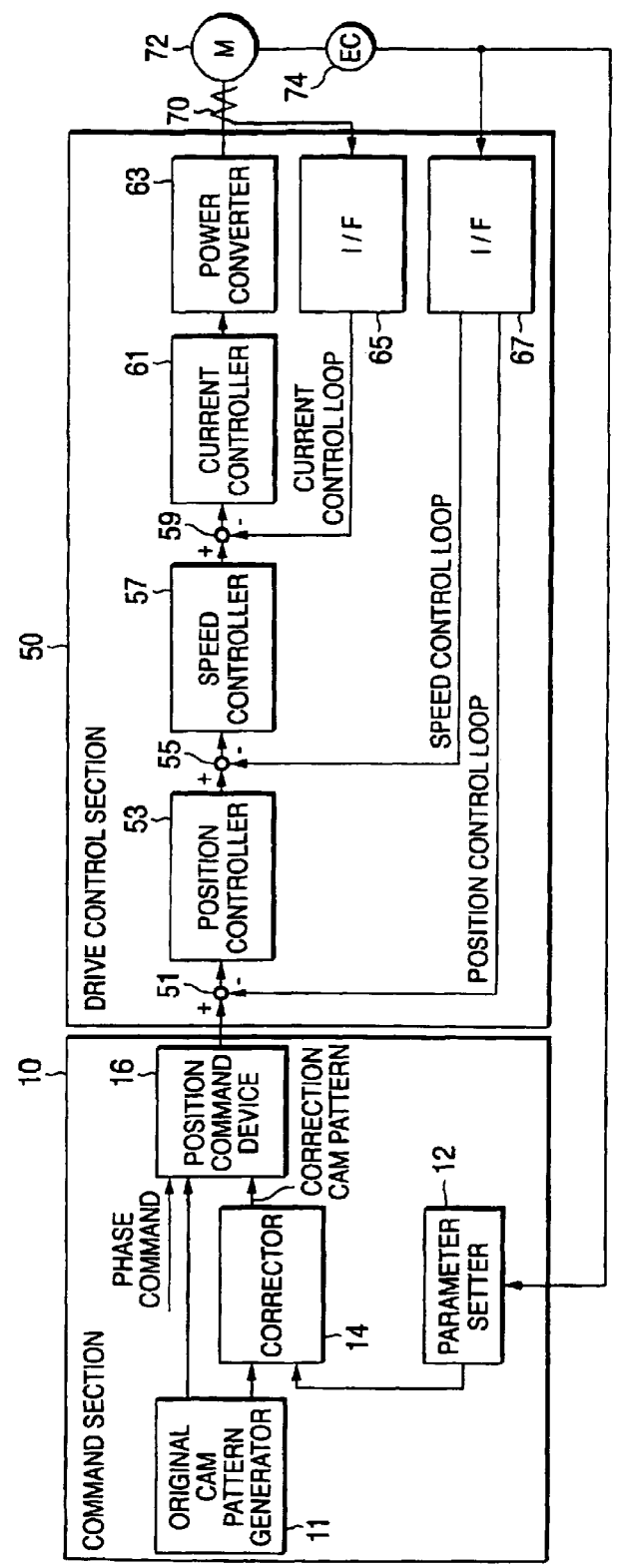
FIG. 1 is a general block diagram of a servo control system to show one embodiment of the invention.

One embodiment of the invention will be discussed with reference to FIGS. 1 and 2. FIG. 1 is a general block diagram of a servo control system to show one embodiment of the invention and FIG. 2 is a general block diagram of the servo control system to show a command section shown in FIG. 1 by hardware.

Figure 2:
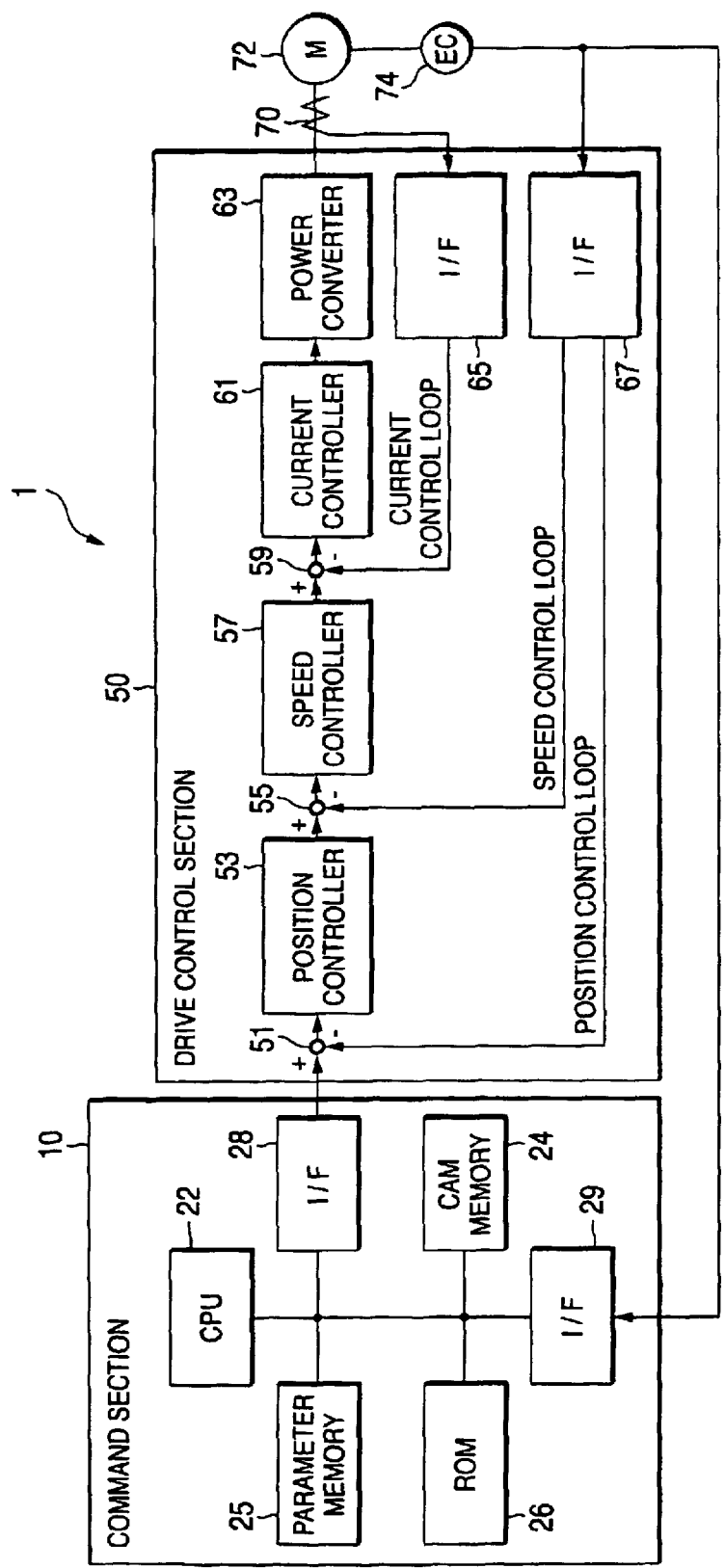
FIG. 2 is a general block diagram of the servo control system to show a command section of the servo control system shown in FIG. 1 by hardware.

In FIGS. 1 and 2, a servo control system 1 includes a command section 10 for generating a position command, a drive control section 50 for controlling drive of a servomotor 72 based on the command of the command section 10, a current sensor 70 for detecting a current flowing into the servomotor 72 and inputting to an interface (I/F) 65, and an encoder 74 for detecting the rotation angle of the servomotor 72 and inputting the rotation angle to an I/F 67.

In FIG. 1, the command section 10 indicates the processing concept of a CPU and includes an original cam pattern generator 11 as pattern generation means for generating an original cam pattern (first pattern) based on the phase corresponding to one revolution of a cam mechanism, a parameter setter 12 for setting a coefficient Tp and a phase D described later, a corrector 14 as correction means for generating a correction cam pattern (correction pattern) provided by differentiating the original cam pattern with respect to time, multiplying the differentiation value by a coefficient (constant) Tp to find a multiplication value, and subtracting the predetermined phase D from the phase corresponding to one revolution of the cam mechanism from the multiplication value, and a position command device 16 as position command generation means for adding the original cam pattern to the correction cam pattern of the corrector 14 to generate a second pattern and generating a position command based on the phase command of the cam mechanism.

In FIG. 2, the hardware configuration of the servo command section 10 includes a CPU 22 and cam memory 24, parameter memory 25, ROM 26, and I/Fs 28 and 29 connected to the CPU 22. The cam memory 24 stores the original cam pattern and the parameter memory 25 stores the coefficient Tp and the phase D described later. The ROM 26 stores an operational expression, etc., (expression (11) described later) for generating the correction cam pattern (correction pattern) provided by differentiating the original cam pattern with respect to time, multiplying the differentiation value by the coefficient (constant) Tp to find a multiplication value, and subtracting the predetermined phase D from the phase corresponding to one revolution of the cam mechanism from the multiplication value.

Output of the I/F 28 is input to the drive control section 50, and output of the encoder 74 is connected to the I/F 29.

The drive control section 50 has three control loops of a position control loop, a speed control loop, and a current control loop, and includes a subtracter 51 for performing a subtraction between the position detection value based on the rotation angle of the encoder 74 read from the I/F 67 and the position command from the command section 10 to find a deviation, a position controller 53 connected to the subtracter 51, a subtracter 55 for performing a subtraction between the speed detection value based on the rotation angle read from the I/F 67 and a speed command from the position controller 53 to find a deviation, a speed controller 57 connected to the subtracter 55, a subtracter 59 for performing a subtraction between the current value of the current sensor 70 read from the I/F 65 and a current command from the speed controller 57, and a power converter 63 with input connected through a current controller 61 connected to the subtracter 59 and output connected to the servomotor 72.

The position control loop includes the position controller 53, the speed controller 57, the current controller 61, the power converter 63, the servomotor 72, the encoder 74, and the I/F 67. The speed control loop includes the speed controller 57, the current controller 61, the power converter 63, the servomotor 72, the encoder 74, and the I/F 67. The current control loop includes the current controller 61, the power converter 63, the current sensor 70, and the I/F 65.

The cam pattern considering a follow-up delay amount in the servo control system generating a position command as in the related art (with no corrector 14) from the command section 10 will be discussed below:

Since the follow-up delay amount is the accumulation pulse amount of the actual position difference between a position command $P_{ref}$ (PLS) and the servomotor 72, a correction position command $P_{rev}$ (PLS) considering a follow-up delay becomes a command with accumulation pulse $P_{dif}$ (PLS) added to the position command $P_{ref}$ as in the following expression:

$$P_{rev} = P_{ref} + P_{dif} \tag{1}$$

Figure 3:
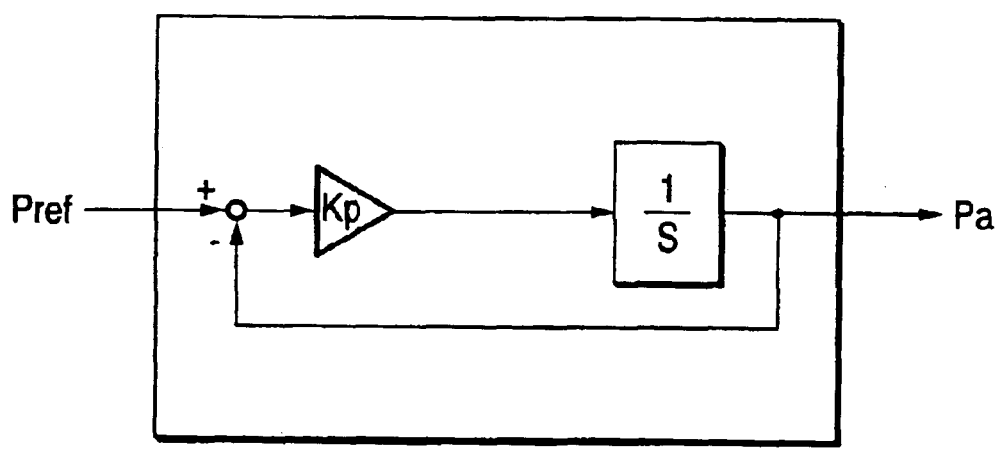
FIG. 3 is a block diagram of a servo control block excluding the command section of the servo control system shown in FIG. 1.

Here, the speed control loop and the current control loop respond at sufficiently high speed as compared with the position control loop and thus the control block of the servo control system can assume that actual position $P_a$ (PLS) of the servomotor 72 is a primary delay block of the position control loop having the position command $P_{ref}$, a position control gain $K_p$, and an integrator 1/S, as shown in FIG. 3.

Therefore, as for the actual position $P_a$ of the servomotor 72, the following expression is obtained about the relationship with the position command $P_{ref}$:

$$P_a = \{1/(1+T_p \cdot S)\} \cdot P_{ref} \tag{2}$$

where $T_p = 1/K_p$, $K_p$: Position control gain

S: Laplace operator

Here, if speed command $V_{ref}$ (PLS/s) and actual speed $V_a$ (PLS/s) of differentiation of the position command $P_{ref}$ and the actual position $P_a$ with respect to time t are indicated, the following expressions result:

$$V_{ref} = dP_{ref}/dt = P_{ref}' \tag{3}$$

$$V_{ref} = dP_{ref}/dt = P'_{ref} \tag{3}$$

$$\begin{aligned} V_a &= dP_a/dt = P'_a \\ &= \{S/(1+T_p \cdot S)\} \cdot P_{ref} \end{aligned} \tag{4}$$

The accumulation pulse $P_{dif}$ becomes the difference between the position command $P_{ref}$ and the actual position $P_a$ as in the following expression:

$$P_{dif} = P_{ref} - P_a \tag{5}$$

Assigning expression (2) to $P_a$ in expression (5) results in the following expression:

$$\begin{aligned} P_{dif} &= \{1 - 1/(1+T_p \cdot S)\} P_{ref} \\ &= T_p \cdot S \cdot P_{ref}/(1+T_p \cdot S) \\ &= T_p \cdot V_a \end{aligned} \tag{6}$$

Assigning above-mentioned expression (5) to above-mentioned expression (1) results in the following expression:

$$P_{rev} = P_{ref} + P_{dif} \quad (7)$$
$$= P_{ref} + T_p \cdot V_a$$

Figure 4:
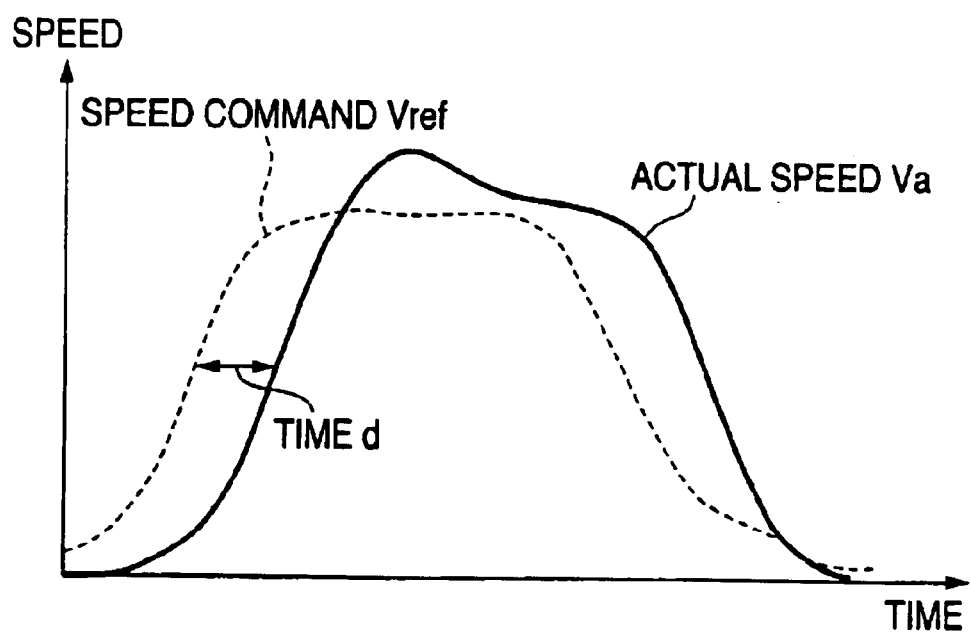
FIG. 4 is a time curve of a speed command and actual speed.

In above-mentioned expression (7), the correction position command $P_{rev}$ is provided by adding the actual speed $V_a$ of the control result based on the command of the original cam pattern to the position command $P_{ref}$ and depends on the actual speed $V_a$ and therefore holds assuming that there is a shift between the original cam pattern and the actual locus. Since the servo control system is assumed to be the primary delay block as shown in FIG. 3, when the speed command $V_{ref}$ is input, the actual speed $V_a(t)$ of a time function becomes almost equal to a speed command $V_{ref}(t-d)$ of a time function shifted in time d (s) as shown in FIG. 4, and becomes the following expression:

$$V_a(t) \cong V_{ref}(t-d) \quad (8)$$

From above-mentioned expressions (4) to (8), the accumulation pulse $P_{dif}$ can be calculated according to the position command $P_{ref}$.

$$P_{dif} = T_p \cdot V_a(t) = T_p \cdot V_{ref}(t-d) \quad (9)$$
$$= T_p \cdot P'_{ref}(t-d)$$

From expressions (1) and (7), the following expression results:

$$P_{rev} = P_{ref} + P_{dif} \quad (10)$$
$$= P_{ref} + T_p \cdot P'_{ref}(t-d)$$

From expression (10), the correction position command $P_{rev}$ can be calculated only by the position command $P_{ref}$.

In the electronic cam control, the position command is created based on an original cam pattern $F_{ref}$ describing a position period relative to a phase and thus the times t and d in above-mentioned expression (10) can be replaced with phases θ(°) and D(°). A second pattern $F_{rev}$ as a position command to be generated from the position command device 14 as the position command with the times replaced with the phases θ and D become the following expression:

$$F_{rev} = F_{ref} + T_p \cdot F_{ref}'(\theta - D) \quad (11)$$

where $F_h = T_p \cdot F_{ref}'(\theta - D)$ $F_h$: Correction cam pattern

From above-mentioned expression (11), the cam operation is periodic control of repetition and thus the correction cam pattern $F_h$ considering a follow-up delay is calculated according to the original cam pattern (first pattern) $F_{ref}$ and is added to the original cam pattern $F_{ref}$ to generate the second pattern $F_{rev}$ and a position command is created in accordance with phase command, whereby a correction position command can be provided easily.

Figure 5:
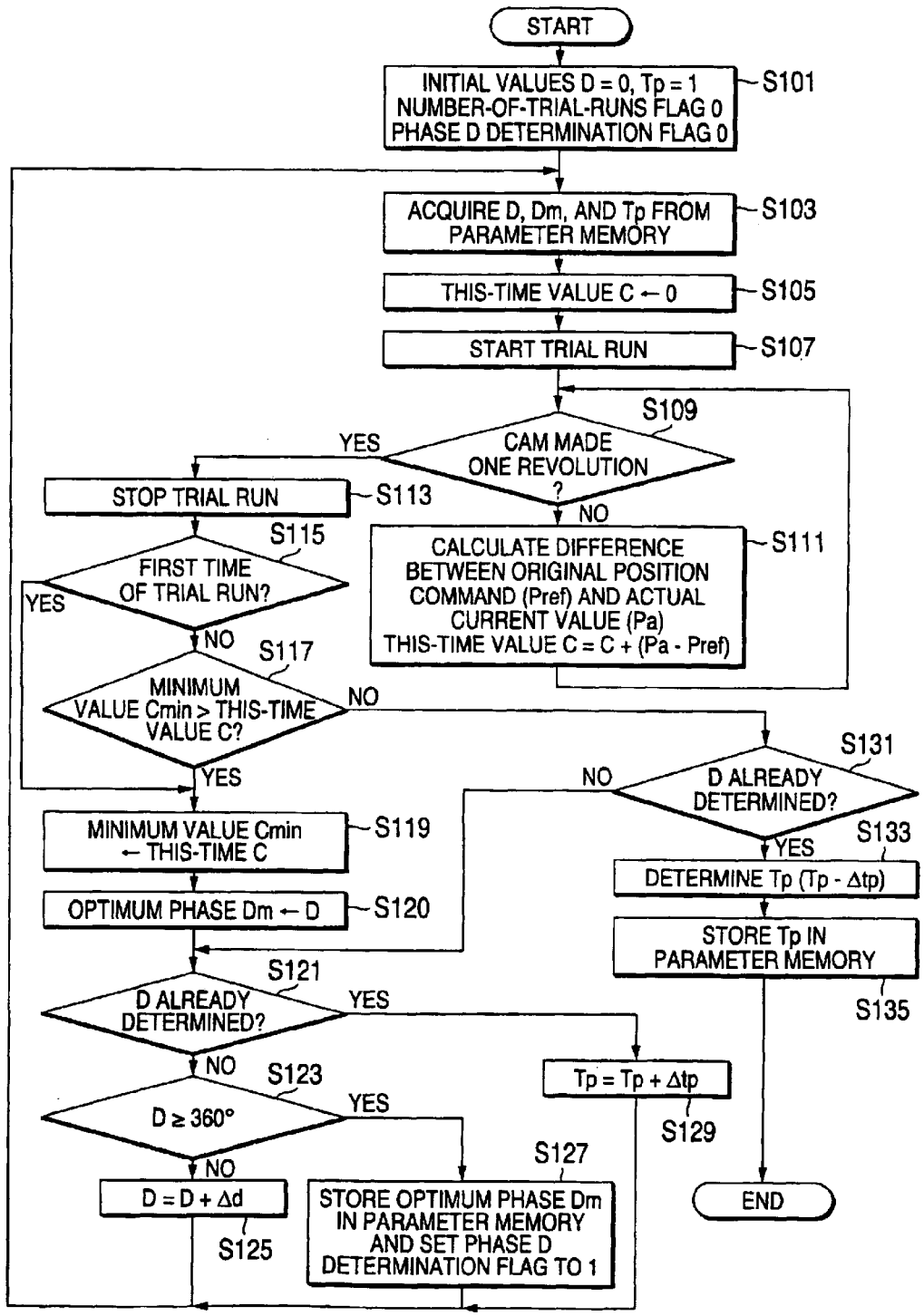
FIG. 5 is a flowchart to show setting of parameters according to the embodiment of the invention.

Setting of the coefficient Tp and the phase D described above will be discussed with reference to FIGS. 2 and 5. FIG. 5 is a flowchart to show the setting order of the coefficient $T_p$ and the phase D.

First, as initial values, phase D=0, coefficient $T_p$=1, number-of-trial-runs flag indicating the number of trial runs 0, and phase D determination flag 0 are input from an input section (not shown) and are stored in the parameter memory 25 (step S101). The CPU 12 reads the phase D and the coefficient $T_p$ from the parameter memory 25 (step S103) and sets this-time value C to zero (step S105). It generates a trial run command from the command section 10 and drives the servomotor 72 through the drive section 50 (step S107). The CPU 12 reads the angle value of the encoder 74 from the I/F 19 and determines whether or not the cam makes one revolution (step S109). Since the cam does not yet make one revolution, the CPU finds the difference (accumulation pulse) $P_{dif}$ between the command value $P_{ref}$ and the actual position $P_a$ until the cam makes one revolution, adds the difference $P_{dif}$ and preceding-time value C together to find the this-time value C related to the phase D, and stores the value in the parameter memory 25 (step S111).

At step S109, driving the servomotor 72 is continued and if the CPU 12 reads the angle value of the encoder 74 from the I/F 19 and determines that the cam makes one revolution (step S109), the command section 10 gives a trial run stop command through the drive section 50 to stop the servomotor 72 (step S113).

The CPU 12 determines whether or not this is the first time of the trial run (step S115). Since the number-of-trial-runs flag is zero, the CPU 12 sets the this-time value C to a minimum value $C_{min}$ and sets the number-of-trial-runs flag from zero to 1 (step S119) and stores the phase D in the parameter memory 25 as an optimum phase $D_m$ corresponding to the minimum value $C_{min}$ set as the this-time value C at step S119 (step S120). The CPU 12 determines whether or not the phase D is already determined (step S121). Since the phase D determination flag is zero, the CPU 12 determines whether or not phase D≧360° (step S123). Since phase D<360°, the CPU 12 adds a predetermined phase Δd to the preceding-time phase D to create the this-time phase D and stores the this-time phase D in the parameter memory 25 (step S125).

The CPU 12 reads the phase D and the coefficient $T_p$ from the parameter memory 25 (step S103) and executes steps S105 to S113 as described above. It determines whether or not this is the first time of the trial run according to the number-of-trial-runs flag (step S115). Since the flag is 1, the CPU 12 makes a comparison between the minimum value $C_{min}$ and the preceding-time value C (step S117). If minimum value $C_{min}$>this-time value C, the CPU 12 sets the this-time value C to the minimum value $C_{min}$ (step S119) and stores the phase D in the parameter memory 25 as the optimum phase $D_m$ corresponding to the minimum value $C_{min}$ set as the this-time value C at step S119 (step S120).

On the other hand, if minimum value $C_{min}$<this-time value C at step S117, the CPU 12 determines whether or not the phase D is determined according to the phase D determination flag. Since the flag is zero (step S131), again at step S121, the CPU 12 determines whether or not the phase D is determined (step S121). Since the phase D is not determined, the CPU 12 determines whether or not phase D≧360° (step S123). Since phase D<360°, the CPU 12 adds the preceding-time value D and Δd together to find the this-time value D and stores the this-time value D in the parameter memory 25 (step S125).

Again, the CPU 12 reads the phase D and the coefficient Tp from the parameter memory 25 (step S103) and executes steps S105 to S121 as described above until the phase D becomes equal to or greater than 360°. The CPU 12 stores the optimum phase $D_m$ corresponding to the smallest difference value between the position command $P_{ref}$ and the actual position $P_a$ in the parameter memory 25 and sets the phase D determination flag to 1 (S127).

Next, since the optimum phase $D_m$ is determined, an optimum coefficient $T_{pm}$ is determined. The CPU 12 reads the optimum phase $D_m$ and the coefficient Tp from the parameter memory 25 (step S103) and executes steps S103 to S117 described above. Since the optimum phase $D_m$ is determined (step S131), the CPU 12 adds a predetermined minute phase $\Delta t_p$ to the preceding-time coefficient $T_p$ to create the this-time coefficient $T_p$ and stores the this-time coefficient $T_p$ in the parameter memory 25 (step S129). As the CPU 12 repeats steps S103 to S129 as described above, at step S117 the CPU 12 determines whether or not minimum value $C_{min}$>this-time value C. If this-time value C>minimum value $C_{min}$, the CPU 12 determines whether or not the phase D is determined (step S131). Since the phase D determination flag is 1, the CPU 12 determines that the preceding-time coefficient $T_{pm}$ is the optimum coefficient $T_{pm}$ corresponding to small difference between the position command $P_{ref}$ and the actual position $P_a$, calculates this-time coefficient $T_p-\Delta t_p$ to find the preceding-time coefficient $T_p$ (step S133), and stores the optimum coefficient $T_{pm}$ in the parameter memory 25 (step S135).

The operation of the servo control system using the optimum phase $D_m$ and coefficient $T_{pm}$ set as described above will be discussed with reference to FIG. 1.

When a start command is generated, in the command section 10, an original cam pattern is generated from the original cam pattern generator 11 and is input to the corrector 14 and the phase D and the coefficient Tp are read from the parameter setter 12 and are input to the corrector 14. The corrector 14 calculates $P_{ref}+T_p \cdot P_{ref}'$ (t−d) and outputs a correction pattern (correction value) to the position command device 16, which then generates a position command based on the transition of a phase command of the cam and the correction pattern for driving the servomotor 72 through the drive control section 50.

Figure 6:
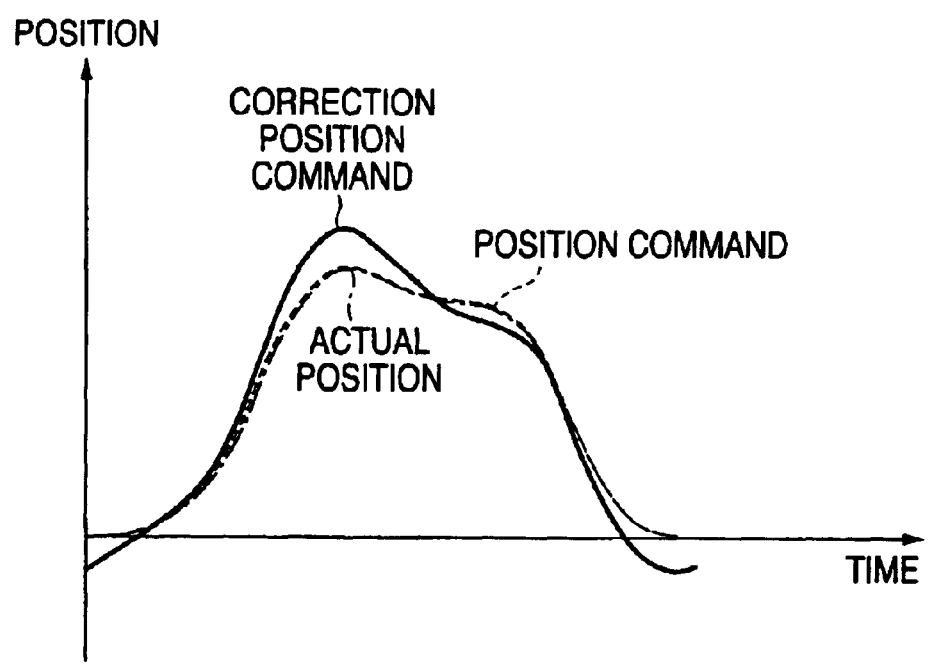
FIG. 6 is a time curve of a correction position command, a position command, and actual position according to the embodiment of the invention.
Figure 7:
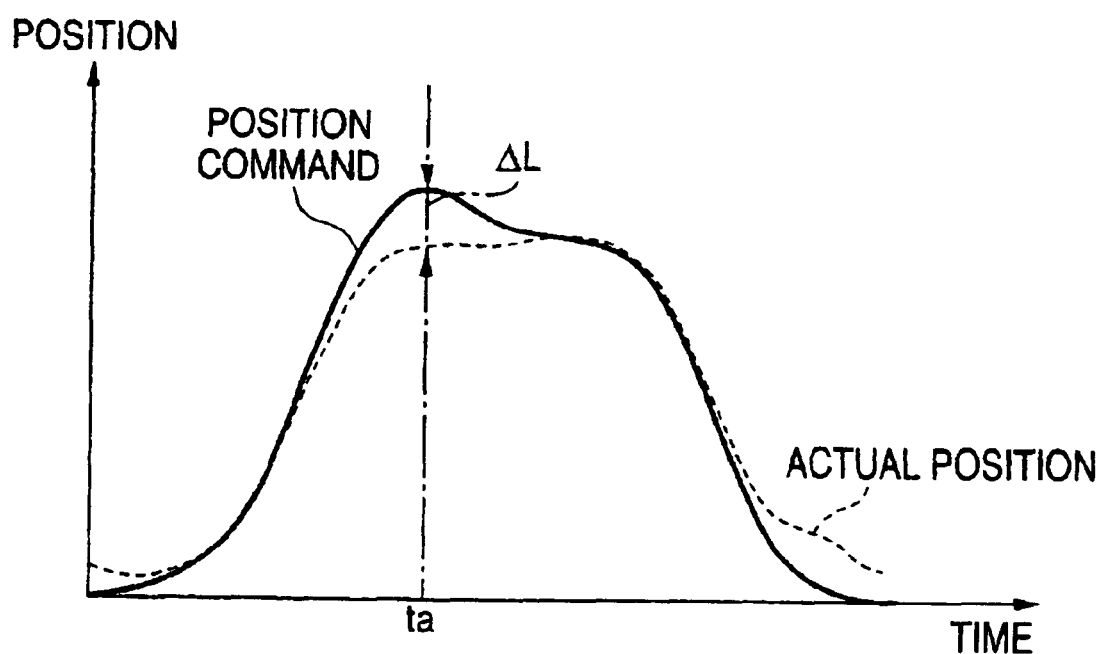
FIG. 7 is a time curve of position command vs. actual position according to a servo control system in a related art.

FIG. 6 shows the result of thus operating the servo control system 1 as a curve of time vs. position. As shown in FIG. 6, it is acknowledged that the locus of the actual positions becomes almost equal to that of the position command based on the original pattern and the phase command according to a correction position command generated from the position command device 14, created based on the optimum coefficient $T_{pm}$ and phase $D_m$ from the original cam pattern.

INDUSTRIAL APPLICABILITY

As described above, the servo control system and its setting method according to the invention are suited for use for controlling an electronic cam.

What is claim is:

1. A servo control system for causing a servomotor to perform operation equivalent to a cam mechanism, the servo control system comprising:

pattern generation means for generating a first pattern of a cam shape relative to a phase corresponding to one revolution of the above-mentioned cam mechanism;

correction means for differentiating the first pattern of the pattern generation means with respect to time, multiplying the differentiation value by a constant to find a multiplication value, and subtracting a predetermined phase from the multiplication value, thereby generating a correction pattern; and position command generation means for adding the correction pattern to the first pattern to generate a second pattern and generating a position command for the servomotor based on the phase corresponding to one revolution of the cam mechanism using the second pattern.

2. A setting method for a servo control system as claimed in claim 1, the setting method comprising executing a first step of presetting a value of the constant, incrementally increasing a predetermined value of the phase, and storing a value at which the difference between a position of the servomotor and the position command of the position command generation means becomes small in storage means as an optimum value of the phase; and then executing a second step of incrementally increasing the value of the constant and storing a value at which the difference between the position of the above-mentioned servomotor and the position command of the position command generation means becomes small as an optimum value of the above-mentioned constant.

3. The servo control system as claimed in claim 1 wherein the constant is a reciprocal of a position control gain in the servo system.

\* \* \* \* \*